Jan. 1, 1929.

C. RICHARDS 1,697,836

POWER TRANSMISSION MECHANISM

Filed March 5, 1927

Inventor

Carl Richards,

By

Attorney

Patented Jan. 1, 1929.

1,697,836

UNITED STATES PATENT OFFICE.

CARL RICHARDS, OF PEORIA, ILLINOIS, ASSIGNOR, BY MESNE ASSIGNMENTS, TO TRIANGLE ADVERTISING SYSTEM, INC., A CORPORATION OF MISSOURI.

POWER-TRANSMISSION MECHANISM.

Application filed March 5, 1927. Serial No. 173,054.

The invention relates to a power transmission mechanism for operating signs and for performing other work where intermittent action is desired.

The object of the present invention is to improve the construction of power transmission mechanism and to provide a simple, practical and efficient mechanism of strong, durable and comparatively inexpensive construction equipped with means for intermittently connecting a driving element in driving engagement with the driven shaft for intermittently and alternately releasing the driven shaft from operative engagement with the driving shaft so that the element or elements connected with or controlled by the driven shaft may have predetermined periods of rest between their operative movements.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Figure 1:
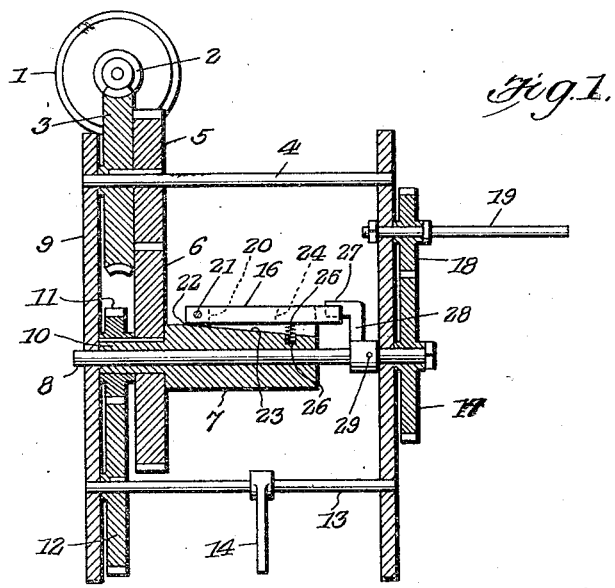
Figure 1 is a vertical longitudinal sectional view of a power transmission mechanism constructed in accordance with this invention.
Figure 2:
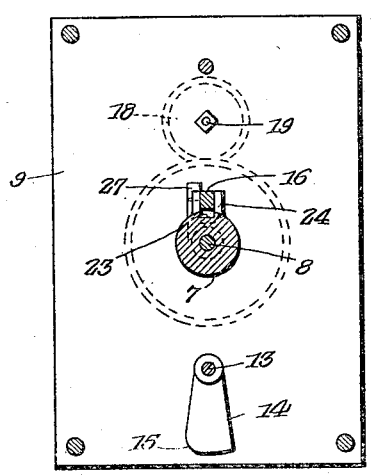
Fig. 2 is a vertical transverse sectional view showing the cam out of engagement with the clutch mechanism.
Figure 3:
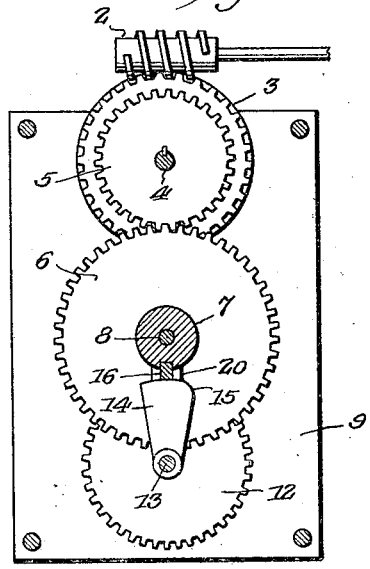
Fig. 3 is a similar view looking in the opposite direction from Fig. 2 and showing the cam in engagement with the clutch mechanism for disengaging the driven shaft from the driving element.
Figure 4:
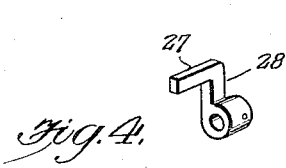
Fig. 4 is a detail perspective view of the fixed arm of the clutch mechanism.

In the accompanying drawing in which is illustrated the preferred embodiment of the invention the power transmission mechanism comprises in its construction a continuously rotating power shaft 1 which is preferably the shaft of an electric motor 2 but any other suitable source of power may of course be employed as will be readily understood. The motor shaft 1 carries a worm 2 which meshes with a worm wheel 3 keyed or otherwise fixed to a horizontal shaft 4. The horizontal shaft 4 has also mounted on it a gear wheel 5 which meshes with a gear wheel 6 of a driving element 7. The driving element 7 is in the form of a sleeve and is mounted for independent rotation on a clutch controlled shaft 8. The shafts 4 and 8 are suitably journaled in a frame 9 which may be of any desired construction and the gears which connect the shaft 1 of the motor 2 may be of any desired ratio to secure the required reduction of speed and a proper application of power to the driving element 7. The driving element 7 is provided at one end with a reduced portion 10 on which is keyed or otherwise secured the gear 6 and a pinion 11 which meshes with a gear wheel 12 of a horizontal cam shaft 13 mounted in frame 9. The cam shaft 13 which operates in timed relation with the driving element 7 is provided with a cam 14 having a peripheral cam face 15 and adapted to engage and operate a relatively movable member 16 of clutch mechanism for controlling the rotation of the shaft 8. The shaft 8 is connected by suitable gears 17 and 18 with a driven shaft 19 and the latter may be connected by any suitable means with any type of sign or other device designed to be intermittently operated and to have periods of action and rest for displaying signs for a predetermined period and for changing the signs after the latter have been displayed for a predetermined length of time. The signs may comprise the ordinary triangular sections or be of any other desired construction.

The relatively movable member 16 consists of a bar extending longitudinally of the sleeve which constitutes the driving element 7 and the said sleeve is provided with spaced ears 20 which are pierced by a pivot 21 forming a fulcrum for the bar 16. The bar 16 which is pivotally mounted between the ears 20 is provided with a heel or portion 22 arranged to engage the sleeve for limiting the outward movement of the bar 16. The sleeve may be provided with a longitudinal recess 23 to receive the bar 16 and lugs 24 are preferably formed integral with the sleeve and are located at opposite sides of the recess adjacent to the free end of the bar 16 for supporting and bracing the same. The bar 16 is normally maintained at the limit of its outward movement by a coiled spring 25 interposed between the sleeve and the bar 16 and preferably seated in a socket 26 of the sleeve. The bar 16 is maintained in its extended position by the spring 25 until it is moved inwardly by the cam 14 which through the rotation of the cam shaft is carried into the path of the bar 16 for withdrawing the same at predetermined intervals from engagement with a lug 27 of a radially projecting arm 28 mounted on the clutch controlled shaft and secured to the same by a suitable fastening device 29. The relatively fixed arm of the clutch device may be secured to the shaft 8 by any form of a pin or key and the lug is arranged in the path of the bar 16 when the latter is at the limit of its outward movement. When the bar 16 is at the limit of its outward movement it engages the lug 27 and carries the same with it in the rotary movement of the sleeve and rotary motion is thereby communicated to the shaft 8 and through the gears 17 and 18 to the driven shaft 19. After a predetermined amount of rotation of the shaft 19 the cam 14 is carried into the path of the arm 16 and the latter will be depressed or moved inwardly and disengaged from the coacting clutch arm 28. This will release the driven shaft from the driving element and at predetermined intervals during the rotation of the driving element the bar 16 will be moved out of the path of the lug 27 and the driven shaft will remain stationary and at a period of rest until the cam through the gearing connecting it with the driven element is carried away from the position in which it engages and depresses the bar 16 when the bar will return to normal position. By varying the extent of the peripheral cam face and the ratio of the gears the desired period of action or rotation of the driven shaft and the desired period of rest may be obtained. This will enable signs to be displayed for a period of time and at the termination of such period to be operated and display another sign or portion of the sign. By varying the extent of the cam surface and the ratio of the gearing the power transmission mechanism may be varied to suit any character of sign or any other device requiring alternative periods of operation and periods of rest.

What is claimed is:

1. A power transmission mechanism including a continuously rotating driving element consisting of a sleeve, a clutch controlled shaft associated with the sleeve, a clutch device for connecting the sleeve with the shaft for driving the latter, said clutch device comprising an arm fixed to the shaft, and a bar pivotally mounted on the sleeve and movable into and out of the path of the arm, a cam operating in timed relation with the sleeve for moving the bar out of the path of the said arm, and means for transmitting motion from the shaft to the device to be intermittently operated.

2. A power transmission mechanism including a continuously rotating driving element consisting of a sleeve having spaced ears and provided with a lug spaced from the ears, a clutch controlled shaft associated with the sleeve, a clutch device comprising a radial arm fixed to the sleeve and having a projecting lug, a bar pivoted between the ears and supported by the lug of the sleeve, yieldable means for normally maintaining the bar in the path of the lug of the arm, said bar having means for limiting its movement under the influence of the yieldable means, a cam operating in timed relation with the driving sleeve for moving the bar out of the path of the lug of the arm, and means for transmitting motion from the clutch controlled shaft to the device to be intermittently operated.

In testimony whereof I have hereunto set my hand.

CARL RICHARDS.